US011138212B2

(12) United States Patent
Jauhari et al.

(10) Patent No.: US 11,138,212 B2
(45) Date of Patent: Oct. 5, 2021

(54) NATURAL LANGUAGE RESPONSE RECOMMENDATION CLUSTERING FOR RAPID RETRIEVAL

(71) Applicant: International Business Machines Corporation, Armonk, NY (US)

(72) Inventors: Arjun Jauhari, Jersey City, NJ (US); Steven Ware Jones, Astoria Queens, NY (US); Jennifer A. Mallette, Vienna, VA (US); Vivek Salve, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 128 days.

(21) Appl. No.: 16/519,795

(22) Filed: Jul. 23, 2019

(65) Prior Publication Data
US 2021/0026858 A1    Jan. 28, 2021

(51) Int. Cl.
*G06F 16/2457* (2019.01)
*G06F 16/28* (2019.01)
*G06F 16/332* (2019.01)

(52) U.S. Cl.
CPC ...... *G06F 16/24578* (2019.01); *G06F 16/285* (2019.01); *G06F 16/3329* (2019.01)

(58) Field of Classification Search
CPC ............ G06F 16/24578; G06F 16/285; G06F 16/3329
See application file for complete search history.

(56) References Cited

U.S. PATENT DOCUMENTS

| 5,694,591 A | 12/1997 | Du et al. |
| 6,189,002 B1 | 2/2001 | Roitblat |
| (Continued) | | |

FOREIGN PATENT DOCUMENTS

| CN | 105868313 A | 8/2016 |
| CN | 106933809 A | 7/2017 |
| EP | 2506151 A1 | 10/2012 |

OTHER PUBLICATIONS

IBM Watson, "Watson Assistant Continuous Improvement Best Practices," 2018. [Accessed Feb. 19, 2019] https://www.ibm.com/downloads/cas/V0XQ0ZRE.

(Continued)

*Primary Examiner* — Jay A Morrison
(74) *Attorney, Agent, or Firm* — Garg Law Firm, PLLC; Rakesh Garg; John Noh

(57) ABSTRACT

An interaction pace for a live natural language interaction is set. An acceptable response latency range is determined according to the interaction pace. By analyzing a live natural language query, a set of metadata tags corresponding to the query is determined. Using the set of metadata tags, a set of clusters of natural language query-response pairs is selected, a size of the set of clusters selected according to the acceptable response latency range. From the set of clusters, a query-response pairs is selected, wherein the query of the query-response pair has above a threshold relevance score with the first natural language query. From the selected query-response pair, a response recommendation is extracted, the response recommendation being a recommended response to the live natural language query, a latency between receipt of the live natural language query and extraction of the response recommendation being within the acceptable response latency range.

20 Claims, 10 Drawing Sheets

(56) References Cited

U.S. PATENT DOCUMENTS

| | | | |
|---|---|---|---|
| 7,606,714 | B2 | 10/2009 | Williams et al. |
| 8,000,973 | B2 | 8/2011 | Williams et al. |
| 9,064,001 | B2 * | 6/2015 | Liu .................... G06Q 30/0641 |
| 2015/0051910 | A1 | 2/2015 | LaVallée |
| 2017/0337477 | A1 | 11/2017 | LaVallée |
| 2018/0032523 | A1 * | 2/2018 | Singhal ............... G06F 16/3322 |
| 2019/0052584 | A1 | 2/2019 | Barve et al. |

OTHER PUBLICATIONS

Haponchyk et al., "Supervised Clustering of Questions into Intents for Dialog System Applications." Proceedings of the 2018 Conference on Empirical Methods in Natural Language Processing, pp. 2310-2321. Brussels, Belgium, Oct. 31-Nov. 4, 2018.

Zhang et al., "A topic clustering approach to finding similar questions from large question and answer archives." PloS one, 9(3), 2014. e71511. doi:10.1371/journal.pone.0071511.

Kannan, "Smart Reply: Automated Response Suggestion for Email." KDD '16 Aug. 13-17, 2016, San Francisco, CA.

Britz, Deep Learning for Chatbots, Part 2—Implementing a Retrieval-Based Model in Tensor, WILDML Arti?cial Intelligence, Deep Learning, and NLP, Jul. 4, 2016.

Bartl et al., A retrieval-based dialogue system utilizing utterance and context embeddings, arXiv:1710.05780v3, Oct. 20, 2017.

International Searching Authority, PCT/IB2020/056378, dated Oct. 21, 2020.

\* cited by examiner

NATURAL LANGUAGE RESPONSE RECOMMENDATION CLUSTERING FOR RAPID RETRIEVAL

TECHNICAL FIELD

The present invention relates generally to a method, system, and computer program product for natural language response recommendation. More particularly, the present invention relates to a method, system, and computer program product for natural language response recommendation clustering for rapid retrieval.

BACKGROUND

A natural language is a scripted (written) or a vocalized (spoken) language having a form that is employed by humans for primarily communicating with other humans or with systems having a natural language interface. Natural language processing (NLP) is a technique that facilitates exchange of information between humans and data processing systems. For example, one branch of NLP pertains to transforming human readable or human understandable content into machine usable data. For example, NLP engines are presently usable to accept input content such as a newspaper article or human speech, and produce structured data, such as an outline of the input content, most significant and least significant parts, a subject, a reference, dependencies within the content, and the like, from the given content.

Another branch of NLP pertains to answering questions about a subject matter based on information available about the subject matter domain. This is the branch of cognitive analytics, and is also referred to as a Question and Answer system (Q and A system). Cognitive analytics is the process of analyzing available information or knowledge to create, infer, deduce, or derive new information.

A chatbot or conversational interface is software that conducts a natural language conversation with a human user. Typically, the natural language conversation is conducted in text form. However, input to the chatbot can also be converted from another modality, such as speech, into text for processing, then output from the chatbot converted back into speech a human can hear. Chatbots are typically used to aid in customer service or information acquisition.

Chatbots are typically implemented in two forms. Retrieval-based chatbots use a repository of pre-defined responses. In particular, a retrieval-based chatbot takes, as input, a context (the conversation up to this point) and a potential response. To find a good response, the chatbot scores multiple potential responses and chooses the response with the highest score. Generative chatbots can generate responses that are not in a repository of pre-defined responses. However, today's generative chatbots tend to make grammatical mistakes, require large amounts of training data, produce irrelevant, generic or inconsistent responses, and are hard to optimize, making them less conversational, hard to understand, and detrimental to a customer experience when used for that purpose.

An agent assist tool is a variation on a chatbot. An agent assist tool receives natural language input and provides, to the agent, one or more recommended natural language responses to the input. Often, a set of recommended natural language responses is provided in the form of a ranked list. However, a human agent performs the final steps of selecting a recommended response, and editing the response if necessary, before the tool provides the response to a human user. An agent assist tool is typically used to help an agent interacting with a customer, in speech or text form. The illustrative embodiments contemplate agent assist tools to become available in humanoid forms as well where the interaction would be a face-to-face or human-to-human-like interaction between a human and a humanoid.

Chatbots and agent assist tools are referred to collectively as conversational systems. Conversational systems are subject to response timing and relevancy requirements. Users, for example customers, interacting with a chatbot or agent using an agent assist tool expect the interaction to seem as interactive as when interacting directly with another person. Thus, the illustrative embodiments recognize that a system's responses must be both sufficiently fast and sufficiently relevant to users' inputs so as to convincingly mimic a human-to-human interaction in speech rate, context understanding, dynamically egressing or ingressing a topic depending on input changes or context changes, or other characteristics of human-to-human interactions.

Response latency refers to a time interval between when a user completes an input (e.g. a text message or voice statement) and when the user receives a reply. Studies have shown that a faster response results in greater satisfaction and better perceptions of a responder than a slower response; thus, response latency of either a chatbot or agent assist tools should be below a threshold. One example response latency threshold is three seconds, because a response latency higher than three seconds is more likely to be perceived as insufficiently responsive. However, when a chatbot or agent assist tool responds too quickly, a user may experience a lower level of confidence in the sincerity, completeness, or trust in the interaction, because too-quick responses are often perceived as generic. Thus, a machine-to-human interaction should be neither too slow nor too fast in order to mimic a human-to-human interaction.

Conversational contingency refers to the degree to which responses over the course of a conversation implicitly refer and semantically relate to the content of prior statements that elicited responses. For example, if two humans are interacting directly, they may have discussed a product some time earlier in the conversation. Then when one asks, "how much is it?" the other knows that "it" refers to the product previously discussed in the conversation. If a chatbot or agent assist tool produces a generic answer that does not sufficiently respond to a human's query, the system is also more likely to be perceived as insufficiently responsive. Thus, responses provided by a conversational system should relate to any context previously established in an interaction with the system.

In conversational systems, a natural language utterance supplied to the system is referred to as a query. A query need not be a grammatical question, or be grammatically correct, but may also be any natural language word or phrase. A response is a natural language utterance supplied by the system in response to a query. A response also need not be a complete sentence or grammatically correct, but may be any natural language word or phrase. A query and a response to the query constitute a query-response pair. Both queries and responses may be in the form of text, speech, or another form of natural language communication.

SUMMARY

The illustrative embodiments provide a method, system, and computer program product. An embodiment includes a method that sets, for a live natural language interaction, an interaction pace. An embodiment determines, according to the interaction pace, an acceptable response latency range.

An embodiment determines, by analyzing a live natural language query, a set of metadata tags corresponding to the query. An embodiment selects, using the set of metadata tags, a set of clusters of natural language query-response pairs, each query-response pair in the set comprising a natural language query and a corresponding natural language response, each cluster in the set defined according to a set of metadata tags previously applied to each query-response pair, a size of the set of clusters selected according to the acceptable response latency range. An embodiment selects, from the set of a query-response pair, wherein the query of the query-response pair has above a threshold relevance score with the first natural language query. An embodiment extracts, from the selected query-response pair, a response recommendation comprising the response of the selected query-response pair, the response recommendation being a recommended response to the live natural language query, a latency between receipt of the live natural language query and extraction of the response recommendation being within the acceptable response latency range An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
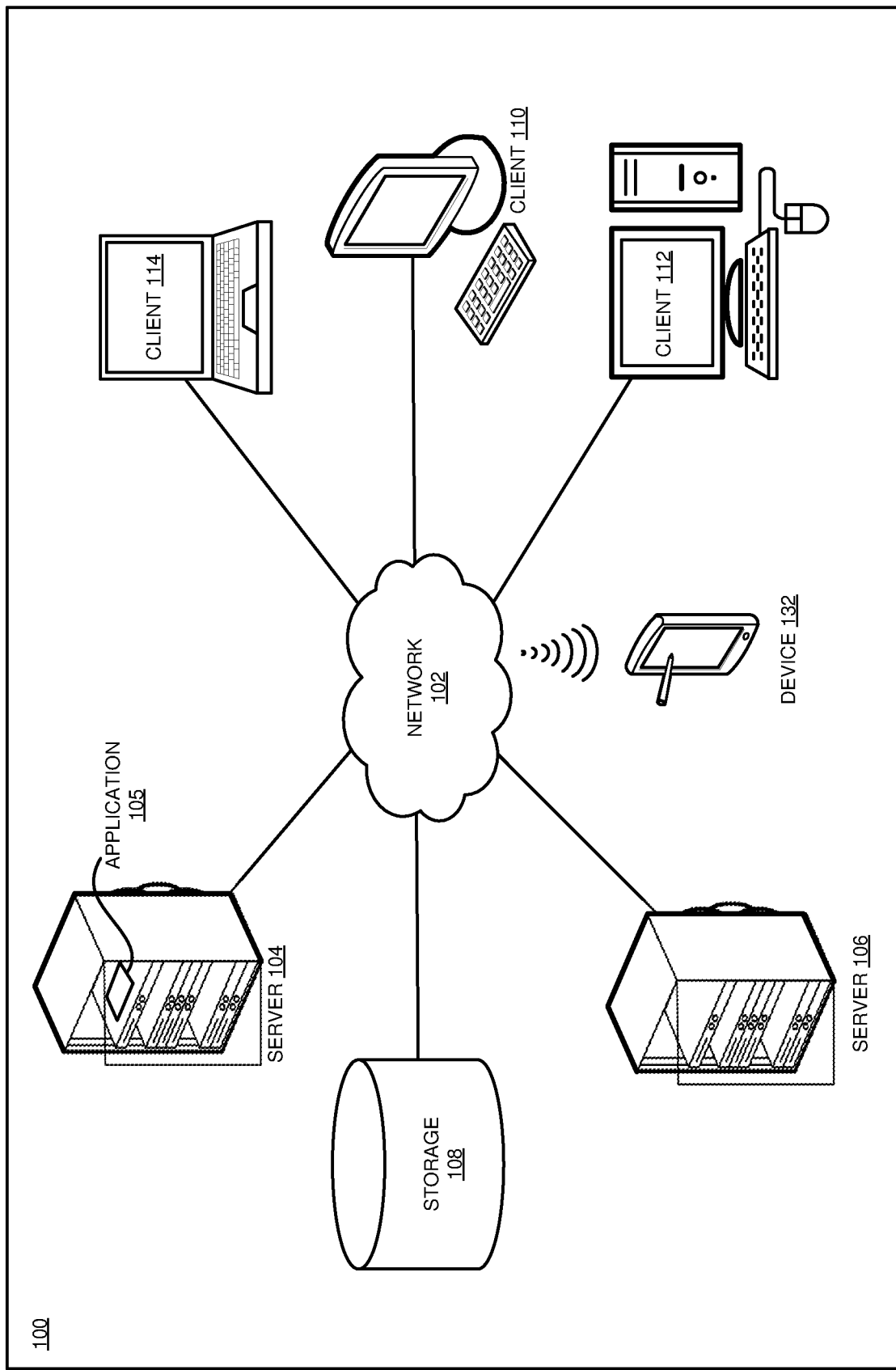
FIG. 1 depicts a block diagram of a network of data processing systems in which illustrative embodiments may be implemented.

The illustrative embodiments recognize that, in conversational systems, a response to a query should be between a low threshold response latency and a high threshold response latency and relate to any context previously established in an interaction with the system. However, there is a tradeoff. When a retrieval-based conversational system is implemented using a large dataset of potential responses to queries, the dataset of potential responses may be too large to effectively search while meeting the response latency goal. Conversely, if the dataset of potential responses to queries is too limited, or filtered extensively to make the response set small for faster responses, the responses themselves are more likely to be perceived as generic or insincere, and thus less likely to answer a specific query. For example, if a potential customer asked about a price of a specific version of a specific product, but instead a received a generic price list including several versions of a product, or a set of products, the customer is unlikely to be satisfied with the result, particularly if the generic price list was supplied in a text message or voice conversation. Further, evaluating the entire response space with a modern neural-network based approach is not currently practical. Consequently, the illustrative embodiments recognize that there is a need to implement a sufficiently large dataset of potential responses in such a way as to minimize response latency.

The illustrative embodiments recognize that the presently available tools or solutions do not address these needs or provide adequate solutions for these needs. The illustrative embodiments used to describe the invention generally address and solve the above-described problems and other problems related to natural language response recommendation clustering for rapid retrieval.

An embodiment can be implemented as a software application. The application implementing an embodiment can be configured as a modification of an existing conversational system, as a separate application that operates in conjunction with an existing conversational system, a standalone application, or some combination thereof.

Particularly, some illustrative embodiments provide a method for natural language response recommendation clustering for rapid retrieval, by clustering potential response recommendations according to a set of semantic criteria, and searching for a response recommendation to a live natural language query within a selected subset of the clusters, thus maintaining a latency between receipt of the live natural language query and response recommendation generation under a threshold latency.

An embodiment constructs a set of clusters of query-response pairs. All the queries in each cluster have above a threshold semantic similarity to each other, as measured using a semantic similarity measurement technique. For example, one technique for determining semantic similarity between two strings (for example, two queries) is to convert each string to a vector representation (i.e., an embedding or numerical representation of text, techniques for which are known), and compute a cosine similarity between the two vector representations. Other techniques for determining semantic similarity are also possible and contemplated within the scope of the illustrative embodiments. All the responses in each cluster also have above a threshold semantic similarity to each other, because the queries are semantically similar. For example, one cluster might include the queries "How can I buy Product XT" and "I want to buy Product X", because both queries relate to an initial purchase inquiry for Product X. Consequently, an example response to either query might be, "I can help you with purchasing Product X. Are you interested in the Basic or the Advanced version'?"

An embodiment constructs the set of clusters of query-response pairs by dividing a dataset of natural language interactions into query-response pairs and applying a set of metadata tags to each pair. The dataset of natural language interactions includes queries, and variations on queries, which an implementation of an embodiment is expected to be able to respond to, as well as responses to the queries. For example, for an implementation of an embodiment to perform customer service for the company producing Product X, the dataset might include query-response pairs relating to the price, features, and availability of Product X, as well as other products and general company information. The dataset of natural language interactions includes, for example, transcripts of online chats, online question-and-answer forums, transcripts of telephone conversations, and other sources of natural language interaction data.

The dataset of natural language interactions can also include optional metadata associated with the interactions. An embodiment also attempts to generate metadata associated with the interactions. One type of metadata in the dataset is information on the role of the query generator. The query generator might have provided role information during a portion of the interaction, or via an intake process or account setup process before the interaction. For example, in a dataset of customer service interactions, the query generator is likely to be a customer or potential customer, with a role such as a basic or advanced user or procurement specialist. Query generators in different roles are likely to expect different responses to queries, even if the queries themselves are similar. For example, when requesting pricing information, an end user of a product might be interested in buying one copy, and paying on shipment, while a procurement specialist might be interested in volume pricing and payment terms.

Another type of metadata in the dataset is information on the responder to the query generator. The responder is referred to herein as an agent, even when the interaction does not involve servicing an inquiry from a customer in an interaction involving customer service. Information on the agent can include, for example, identification data of a specific agent, with a link to a profile of that agent's knowledge and experience. Alternatively, information on the agent can include a classification of the agent's knowledge, experience, or both. In general, an agent with more experience working as an agent, more knowledge of a particular product, or another combination of knowledge and experience, can be expected to produce more helpful responses to queries than an agent with less experience working as an agent, less knowledge of a particular product, or another combination of knowledge and experience.

Another type of metadata in the dataset is date and time information for an interaction. Because a recent interaction is more likely to include currently relevant data than an older interaction, a recent interaction is likelier to include a correspondingly more helpful response to a query.

Another type of metadata in the dataset is information on an outcome of an interaction. An outcome describes a result of an interaction. For example, in a customer service interaction, an interaction that resulted in a sales lead or a sale has had a positive outcome, while an interaction that resulted in a customer returning a product because it was not as expected has had a negative outcome.

An embodiment assigns an intent tag to a query-response pair based on a natural language intent analysis model's classification of an intent of a query of the pair. An intent, as used herein, is a query classification. The intent classifier can be, for example, a support vector machines (SVM), neural network, Watson Natural Language Classifier (NLC) trained on labeled utterance data, or logistic regression model. (Watson is a registered trademark of International Business Machines Corporation in the United States and other countries.) For example, the query, "How can I buy Product X?" might be classified into an intent of "purchase". As another example, the query, "What's the difference between the basic and advanced versions?" might be classified into an intent of "product information".

An embodiment assigns a sentiment tag to a query-response pair based on a natural language sentiment analysis model's classification of a sentiment of the pair in context. A sentiment, as used herein, is a classification of a query generator's reaction to an entire interaction, including at least one query-response pair, based on the interaction itself and any available metadata of an outcome of the interaction. One non-limiting example of a sentiment analysis model is Watson Sentiment Analysis. Sentiment analysis can be performed using any suitable technique, including using a commercially available sentiment analysis service. For example, if an interaction ended with a customer saying, "Great, thanks, that what was I wanted," or resulted in a sale, each pair in the interaction might be tagged as "high" or "positive". Conversely, if an interaction ended with an interaction initiator abandoning an interaction, each pair in the interaction might be tagged as "low" or "negative". One embodiment removes any interactions tagged with a sentiment below a threshold sentiment from the clustered dataset, because these interactions are unlikely to provide recommended responses that lead to a positive outcome. Another embodiment does not remove such negative interactions. Instead, an embodiment can make use of such negative interactions, for example to warn an agent that a live query could lead to a similar negative result.

An embodiment assigns an entity tag to a query-response pair based on a natural language entity analysis model's classification of an entity of the pair in context. An entity, as used herein, is a subject of a query. Entity analysis can be performed using any suitable technique, including using a commercially available entity analysis service (in one non-limiting example, Watson Natural Language Understanding), with either a custom or off-the-shelf named entity recognition model. For example, the query, "How can I buy Product XT" might have an entity tag of "Product X". An entity analysis model can also infer an entity from context. One embodiment applies an entire interaction up until and including a query-response pair being classified to an entity analysis model giving greater weight to more recently mentioned entities within the same interaction. For example, if a previous portion of an interaction dealt with Product X, then a customer queried, "how much is it?" an embodiment infers that "it" refers to the previously-discussed Product X and classifies the entity of the query as Product X.

An embodiment assigns a role tag to a query-response pair based on profile data of a query generator and a natural language profile analysis model's classification of the query generator. Profile analysis can be performed using any suitable technique. For example, a model might classify a query generator's role into broad categories, such as technical or decision maker, or more specific roles such as procurement specialist, data scientist, people manager, c-level executive, or designer.

An embodiment uses any already-assigned metadata tags, as well as a natural language semantic analysis model's classification of a query-response pair, to assign a cluster tag to a query-response pair based on into a cluster of semantically similar pairs. One embodiment performs clustering based only on the queries, another embodiment performs clustering based only on the responses, and another embodiment performs clustering based on the query-response pairs. Semantic clustering by query yields response clusters segregated into groups based on how semantically similar the queries were. Thus, clustering by query yields semantic clusters of responses in which each response cluster answers a group of semantically similarly phrased queries. As a result, clustering by query tends to cluster around the different types of questions being posed. Clustering by response segregates the response space into groups with similar semantic responses, yielding groups of semantically similar responses regardless of the different types of queries that prefaced those responses. Thus, an embodiment can use clustering on the responses to provide good response diversity by ensuring that responses are selected from different clusters. Clustering by both query and response yields groups of responses which are clustered by how similar a query-response pair is from other query-response pairs, resulting in groups of semantically similar responses that answered semantically similar questions. Thus, clustering by query-response pairs best for datasets in which subtle differences in either queries or responses produce large changes in context.

An embodiment uses an unsupervised clustering technique to perform the classification, by identifying patterns of keywords within the queries or pairs, and grouping pairs with similar keyword patterns together. One embodiment uses term frequency-inverse document frequency (tf-idf, or TFIDF), a numerical statistic that reflects how important a word is to a larger grouping of narrative text, to identify keywords. An embodiment converts the keywords to a vector or other numerical representation, using any suitable technique. An embodiment then uses any suitable technique, for example a k-means clustering method, to partition the numerical representations into a set of clusters in which each numerical representation belongs to the cluster with the nearest mean to the numerical representation. As a result, all the responses in each cluster also have above a threshold semantic similarity to each other.

An embodiment assembles any assigned metadata tags, including a cluster tag, into a set of metadata tags corresponding to a pair in the dataset. The set of metadata tags includes one or more of an intent tag, sentiment tag, entity tag, and a role tag as described herein.

An embodiment sets an interaction pace for a live natural language interaction. An interaction pace is a time interval between a query and a response in the interaction. Then, according to the interaction pace, an embodiment determines an acceptable response latency range. An acceptable response latency range includes both a low limit determining a minimum response latency and a high limit determining a maximum response latency.

Once an embodiment has constructed and tagged the set of clusters of query-response pairs, an embodiment can use the set of clusters to generate one or more recommended responses to a live natural language query. In particular, an embodiment receives a live natural language query and, if not already in text form, converts the query into text form using any suitable technique for ease of processing.

An embodiment determines a set of metadata tags corresponding to the live query. To determine the set of metadata tags, an embodiment assigns one or more of an intent tag, a sentiment tag, an entity tag, and a role tag in a manner described herein.

Using the set of metadata tags, an embodiment selects one or more query-response pairs within one or more clusters to send to a neural network-based response scoring engine. The scoring engine scores one or more query-response pairs within a cluster, and the scoring criterion is the relevance of the scored pair to the live query. Thus, each pair with a score above a threshold score is likely to include a response is suitable for answering the live query. One embodiment uses a set of stored clusters. Another embodiment forms a set of clusters, dynamically.

One embodiment selects, for scoring, at least one query-response pair from every cluster having metadata tags matching the live query's set of metadata tags. However, in a large dataset, scoring a sample from every matching cluster may result in a response latency above a threshold response latency. As a result, another embodiment performs a partial scoring of pairs within a subset of the clusters with matching metadata tags. If the partial scoring does not result in a sufficient set of query-response pairs, the embodiment selects a different subset of clusters and scores pairs within the different subset. Thus, another embodiment determines a size of the set of clusters according to the acceptable response latency range.

One embodiment determines a set of high performing clusters. The high performing clusters are clusters that include a number or percentage, above a threshold number or percentage, of stored queries above a threshold relevance to the live query. The embodiment then randomly selects further recommended responses from the set of high performing clusters, or from sub-clusters or further sub-cluster subsets. Then, once an embodiment identifies one or more storied queries meeting the search criteria, an embodiment provides one or more recommended responses, where each recommended response is a stored response corresponding to one of the identified queries.

By clustering the dataset of stored query-response pairs, and identifying one or more clusters in which to search for a response recommendation corresponding to a live query, an embodiment reduces response latency below a threshold latency, allowing the live query to be responded to in a manner consistent with a real-time interaction.

In an embodiment acting as an agent assist tool, an agent selects a response recommendation, optionally modifies the recommendation, and provides a response to the generator of the live query. In an embodiment acting as a chatbot, the chatbot selects a response recommendation (e.g. the highest-ranked response recommendation) and provides the response directly to the generator of the live query, without a human agent's involvement.

An embodiment can also be configured to learn from the live query, response recommendation, and eventual results of an interaction including the live query. For example, if an agent accepts a recommended response as-is, provides the response to a query generator, and the interaction concludes successfully, an embodiment can assume that the recommended response is a satisfactory response to the live query, and adds the tagged live query and recommended response to the set of clusters of tagged query-response pairs. In this manner, live queries are usable to keep the set of clusters up to date.

The manner of natural language response recommendation clustering for rapid retrieval described herein is unavailable in the presently available methods in the technological field of endeavor pertaining to conversational systems. A method of an embodiment described herein, when implemented to execute on a device or data processing system, comprises substantial advancement of the functionality of that device or data processing system in clustering potential response recommendations according to a set of semantic criteria, then searching for a response recommendation to a live natural language query within a selected subset of the clusters, thus maintaining a latency between receipt of the live natural language query and response recommendation generation under a threshold latency.

The illustrative embodiments are described with respect to certain types of queries, responses, query-response pairs, analyses, models, metadata, metadata tags, thresholds, contexts, measurements, devices, data processing systems, environments, components, and applications only as examples. Any specific manifestations of these and other similar artifacts are not intended to be limiting to the invention. Any other suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
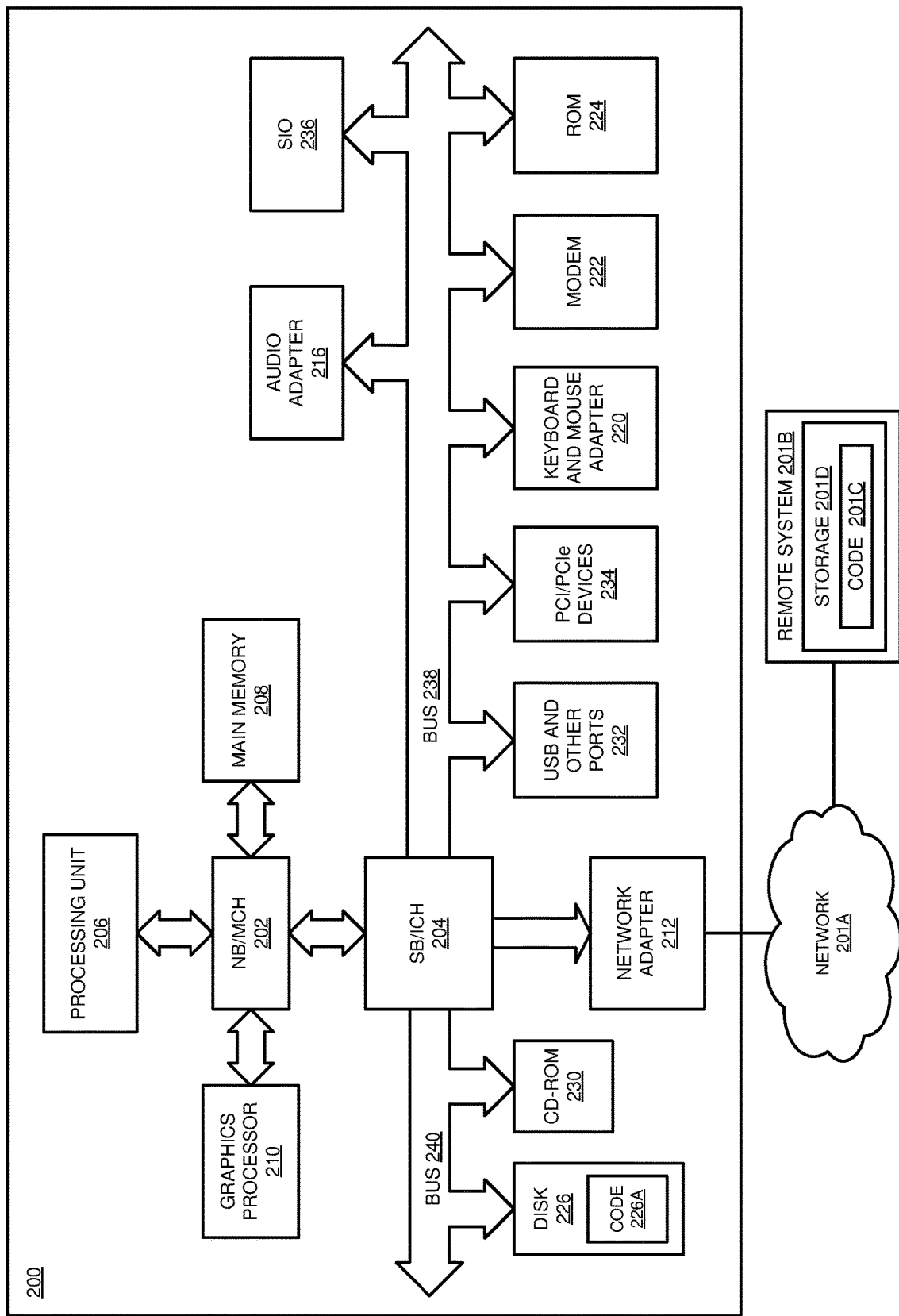
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 can execute in any of servers 104 and 106, clients 110, 112, and 114, and device 132. In addition, a live query can be input to application 105 using any suitable application, such a texting application executing on device 132, a voice communication application executing on any of clients 110, 112, and 114, and device 132 equipped with a microphone, or a text entry feature of a website displayed using a browser executing in any of clients 110, 112, and 114, and device 132.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. In another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
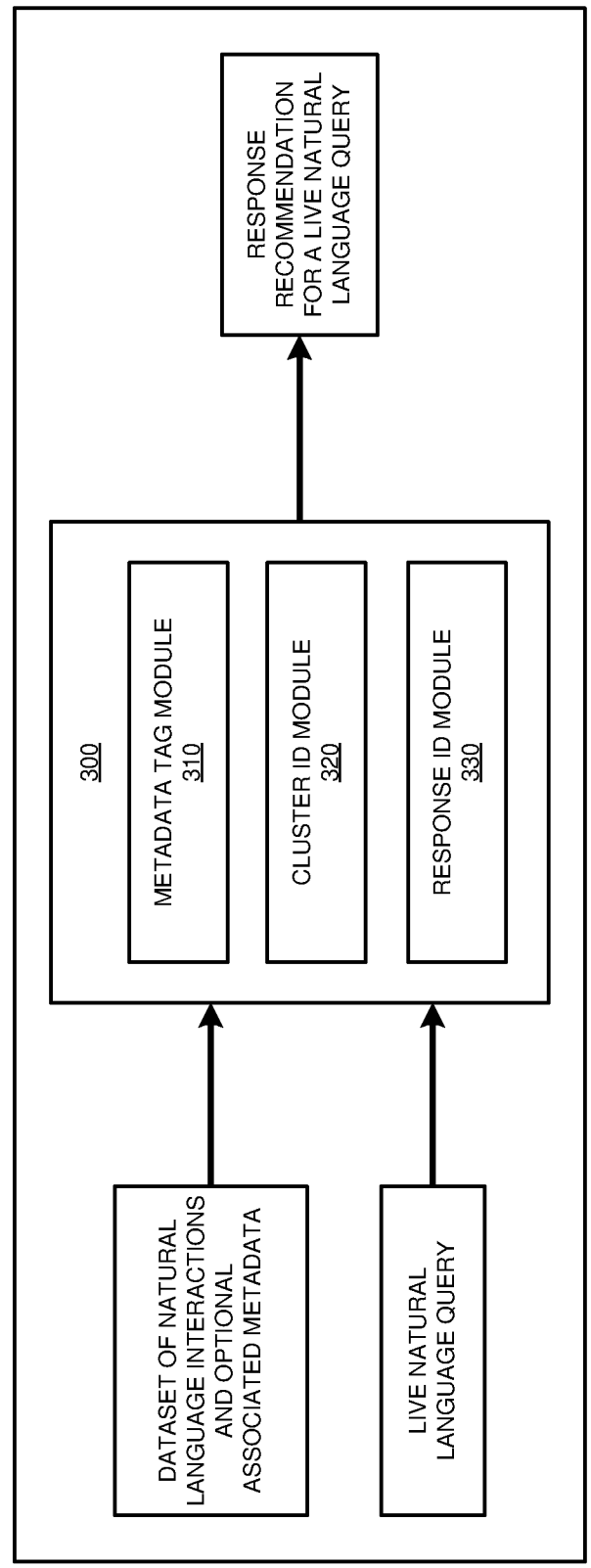
FIG. 3 depicts a block diagram of an example configuration for natural language response recommendation clustering for rapid retrieval in accordance with an illustrative embodiment.

With reference to FIG. 3, this figure depicts a block diagram of an example configuration for natural language response recommendation clustering for rapid retrieval in accordance with an illustrative embodiment. Application 300 is an example of application 105 in FIG. 1 and executes in any of servers 104 and 106, clients 110, 112, and 114, and device 132 in FIG. 1.

Application 300 takes as input a dataset of natural language interactions optional associated metadata. The dataset of natural language interactions includes, for example, transcripts of online chats, online question-and-answer forums, transcripts of telephone conversations, and other sources of natural language interaction data. Metadata in the dataset includes information on the role of the query generator and on the responder to the query generator, date and time information for an interaction, and information on an outcome of an interaction.

Metadata tag module 310 divides the input dataset of natural language interactions into query-response pairs and applies a set of metadata tags to each pair. One of the metadata tags is a cluster tag, organizing each query-response pair in the dataset into a cluster of semantically similar pairs More detail of module 310 is described with reference to FIG. 4.

Application 300 also takes as input a live natural language query and, if not already in text form, converts the query into text form using any suitable technique for ease of processing. Metadata tag module 310 determines a set of metadata tags corresponding to the live query. Using the set of metadata tags, cluster identification module 320 selects one or more query-response pairs within one or more clusters to send to a neural network-based response scoring engine for scoring. The scoring engine scores one or more query-response pairs within a cluster, and the scoring criterion is the relevance of the scored pair to the live query. Thus, each pair with a score above a threshold score is likely to include a response is suitable for answering the live query. Thus, once module 320 identifies, within one or more clusters, one or more storied queries meeting the search criteria, response identification module 330 provides one or more recommended responses, where each recommended response is a stored response corresponding to one of the identified queries.

Figure 4:
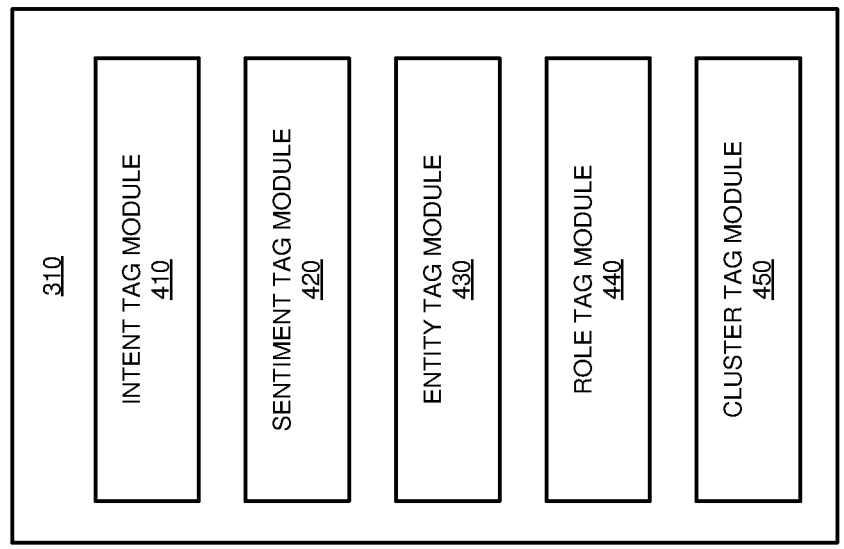
FIG. 4 depicts another block diagram of an example configuration for natural language response recommendation clustering for rapid retrieval in accordance with an illustrative embodiment.

With reference to FIG. 4, this figure depicts another block diagram of an example configuration for natural language response recommendation clustering for rapid retrieval in accordance with an illustrative embodiment. In particular, FIG. 4 depicts more detail of metadata tag module 310 in FIG. 3.

Intent tag module 410 assigns an intent tag to a query-response pair based on a natural language intent analysis model's classification of an intent of a query of the pair. Sentiment tag module 420 assigns a sentiment tag to a query-response pair based on a natural language sentiment analysis model's classification of a sentiment of the pair in context. Entity tag module 430 assigns an entity tag to a query-response pair based on a natural language entity analysis model's classification of an entity of the pair in context. Module 430 applies an entire interaction up until and including a query-response pair being classified to an entity analysis model giving greater weight to more recently mentioned entities within the same interaction. Role tag module 440 assigns a role tag to a query-response pair based on profile data of a query generator and a natural language profile analysis model's classification of the query generator.

Cluster tag module 450 uses any already-assigned metadata tags, as well as a natural language semantic analysis model's classification of a query-response pair, to assign a cluster tag to a query-response pair based on into a cluster of semantically similar pairs. Tag module 450 can be configured to perform clustering based only on the queries, based only on the responses, or based on the query-response pairs. Module 450 uses an unsupervised clustering technique to perform the classification, by identifying patterns of keywords within the queries or pairs, and grouping pairs with similar keyword patterns together.

Figure 5:
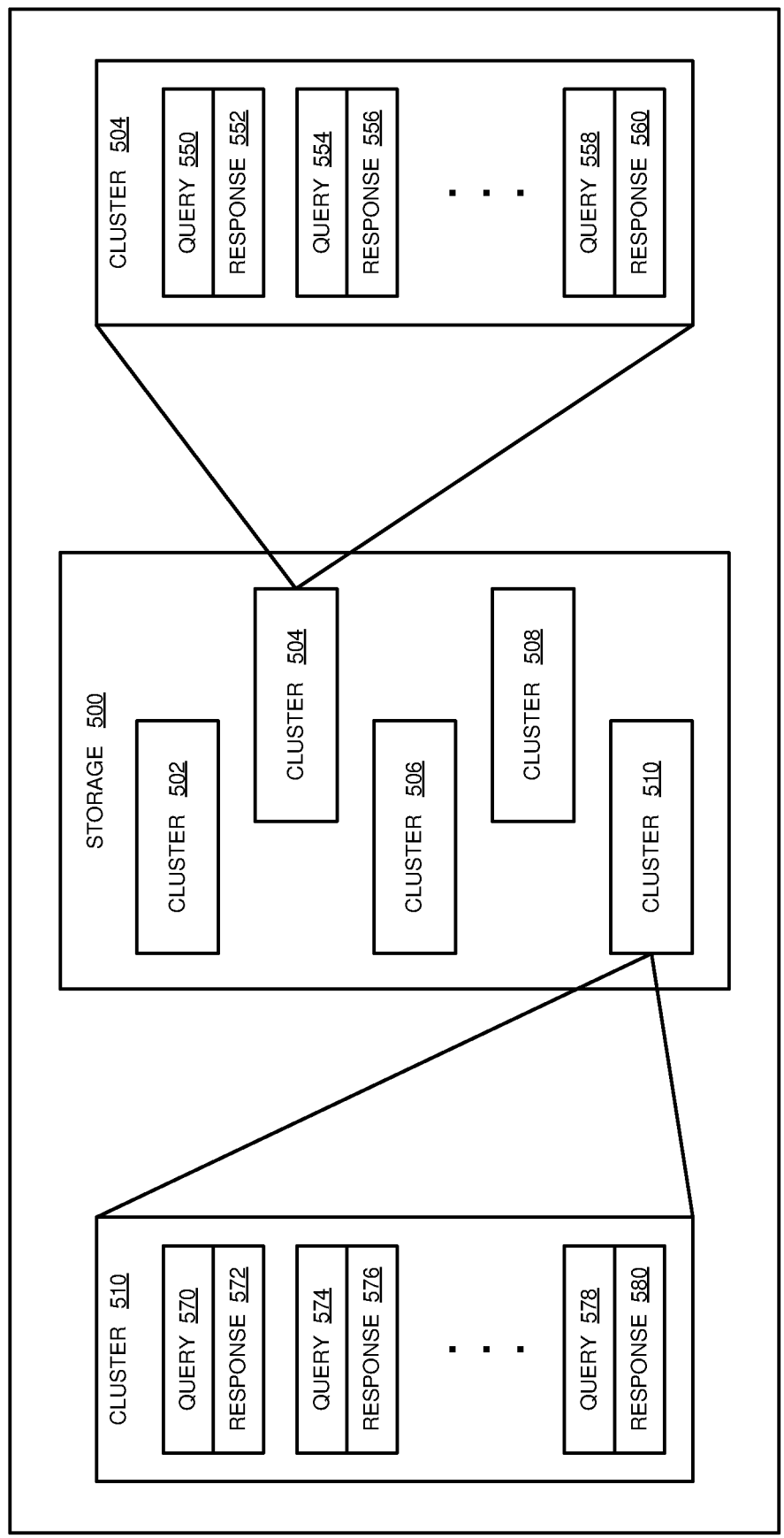
FIG. 5 depicts an example of natural language response recommendation clustering for rapid retrieval in accordance with an illustrative embodiment.

With reference to FIG. 5, this figure depicts an example of natural language response recommendation clustering for rapid retrieval in accordance with an illustrative embodiment. The example can be executed using application 300 in FIG. 3.

Storage 500 includes clusters 502, 504, 506, 508, and 510. Each cluster includes a set of query-response pairs with above a threshold semantic similarity to each other. For example, cluster 504 includes query 550, response 552, query 554, response 556, query 558, and response 560.

Similarly, cluster 510 includes query 570, response 572, query 574, response 576, query 578, and response 580.

Figure 6:
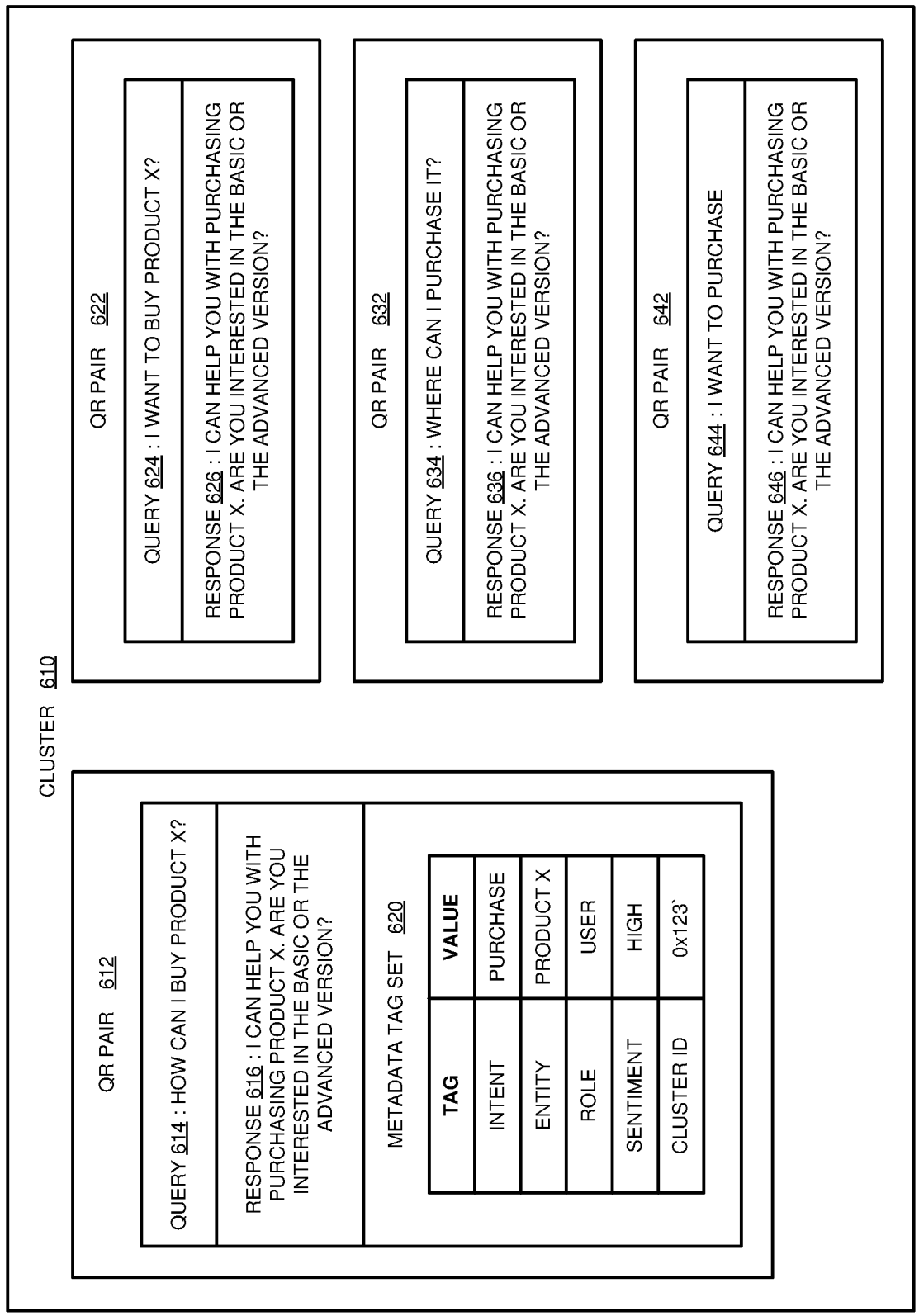
FIG. 6 depicts another example of natural language response recommendation clustering for rapid retrieval in accordance with an illustrative embodiment.

With reference to FIG. 6, this figure depicts another example of natural language response recommendation clustering for rapid retrieval in accordance with an illustrative embodiment. The example can be executed using application 300 in FIG. 3.

Cluster 610 includes query-response (QR) pairs 612, 622, 632, and 642, each with above a threshold semantic similarity to each other and matching sets of metadata tags. QR pair 612 includes query 614, a natural language query about buying Product X. QR pair 612 also includes response 616, a natural language response to the query. QR pair 612 also includes metadata tag set 620, including an intent tag, sentiment tag, entity tag, role tag, and cluster tag. The cluster tag is simply an identification number corresponding to cluster 610. QR pair 622 includes query 624, a natural language query about buying Product X, and response 626, a natural language response to the query. QR pair 632 includes query 634, a natural language query about buying Product X, and response 636, a natural language response to the query. QR pair 642 includes query 644, a natural language query about buying Product X, and response 646, a natural language response to the query. Queries 614, 624, 634, and 644 are all semantic variations on a product purchase query for Product X. Note that although responses 616, 626, 636, and 646 are all the same in the depicted example, this need not be the case.

Figure 7:
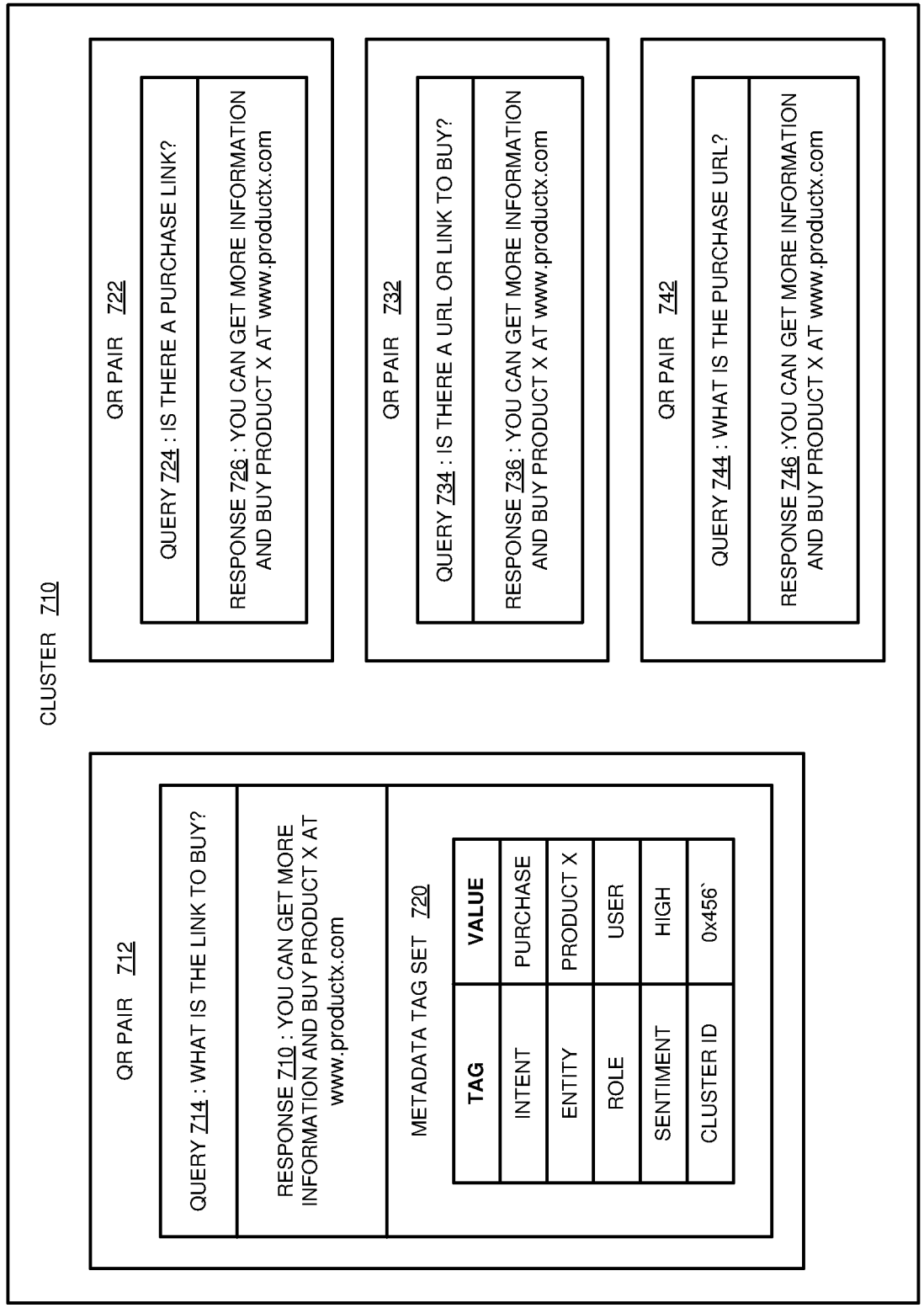
FIG. 7 depicts another example of natural language response recommendation clustering for rapid retrieval in accordance with an illustrative embodiment.

With reference to FIG. 7, this figure depicts another example of natural language response recommendation clustering for rapid retrieval in accordance with an illustrative embodiment. The example can be executed using application 300 in FIG. 3.

Cluster 710 includes query-response (QR) pairs 712, 722, 732, and 742, each with above a threshold semantic similarity to each other and matching sets of metadata tags. QR pair 712 includes query 714, a natural language query about a Universal Resource Locator (URL) at which to purchase Product X. QR pair 712 also includes response 716, a natural language response to the query. QR pair 712 also includes metadata tag set 720, including an intent tag, sentiment tag, entity tag, role tag, and cluster tag. The cluster tag is simply an identification number corresponding to cluster 710. QR pair 722 includes query 724, a natural language query about a URL at which to purchase Product X, and response 726, a natural language response to the query. QR pair 732 includes query 734, a natural language query about a URL at which to purchase Product X, and response 736, a natural language response to the query. QR pair 742 includes query 744, a natural language query about a URL at which to purchase Product X, and response 746, a natural language response to the query. Queries 714, 724, 734, and 744 are all semantic variations on a purchase URL query for Product X.

Figure 8:
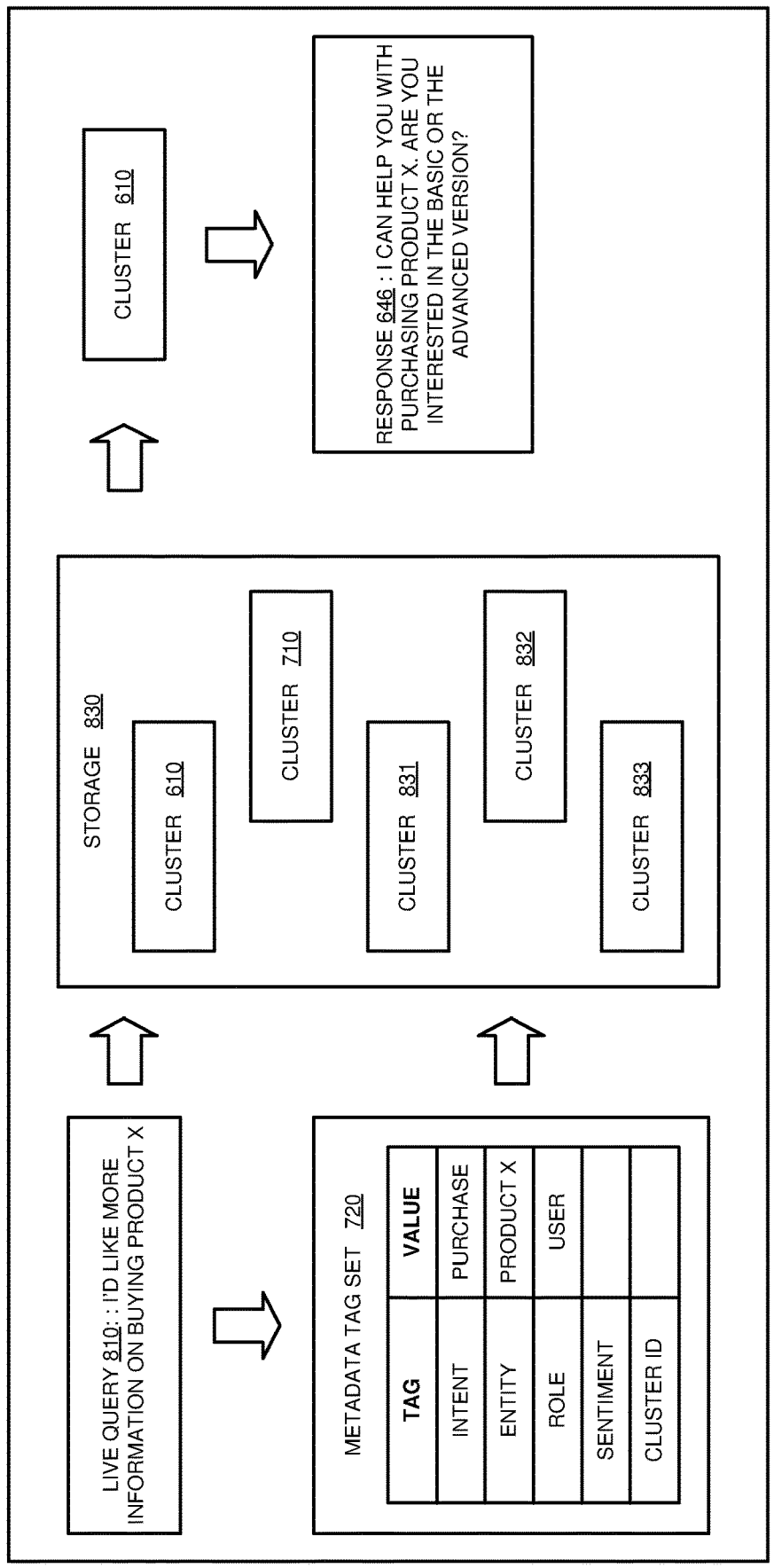
FIG. 8 depicts another example of natural language response recommendation clustering for rapid retrieval in accordance with an illustrative embodiment.

With reference to FIG. 8, this figure depicts another example of natural language response recommendation clustering for rapid retrieval in accordance with an illustrative embodiment. The example can be executed using application 300 in FIG. 3. Cluster 610 is the same as cluster 610 in FIG. 6. Cluster 710 is the same as cluster 710 in FIG. 7.

Storage 830 includes a tagged set of clusters of query-response pairs, such as clusters 610, 710, 831, 832, and 833. Application 300 receives live query 810, a natural language query about buying Product X, and determines metadata tag set 720 corresponding to live query 810 in a manner described herein. Using metadata tag set 720, application 300 selects one or more query-response pairs within one or more clusters in storage 830 to send to a neural network-based response scoring engine. The scoring engine scores one or more query-response pairs within a cluster, and the scoring criterion is the relevance of the scored pair to a live query. Thus, each pair with a score above a threshold score is likely to include a response is suitable for answering live query 810. Application 300 determines that cluster 610 includes a suitable stored query-response pair, and produces response 646 for use as a recommended response to live query 810.

Figure 9:
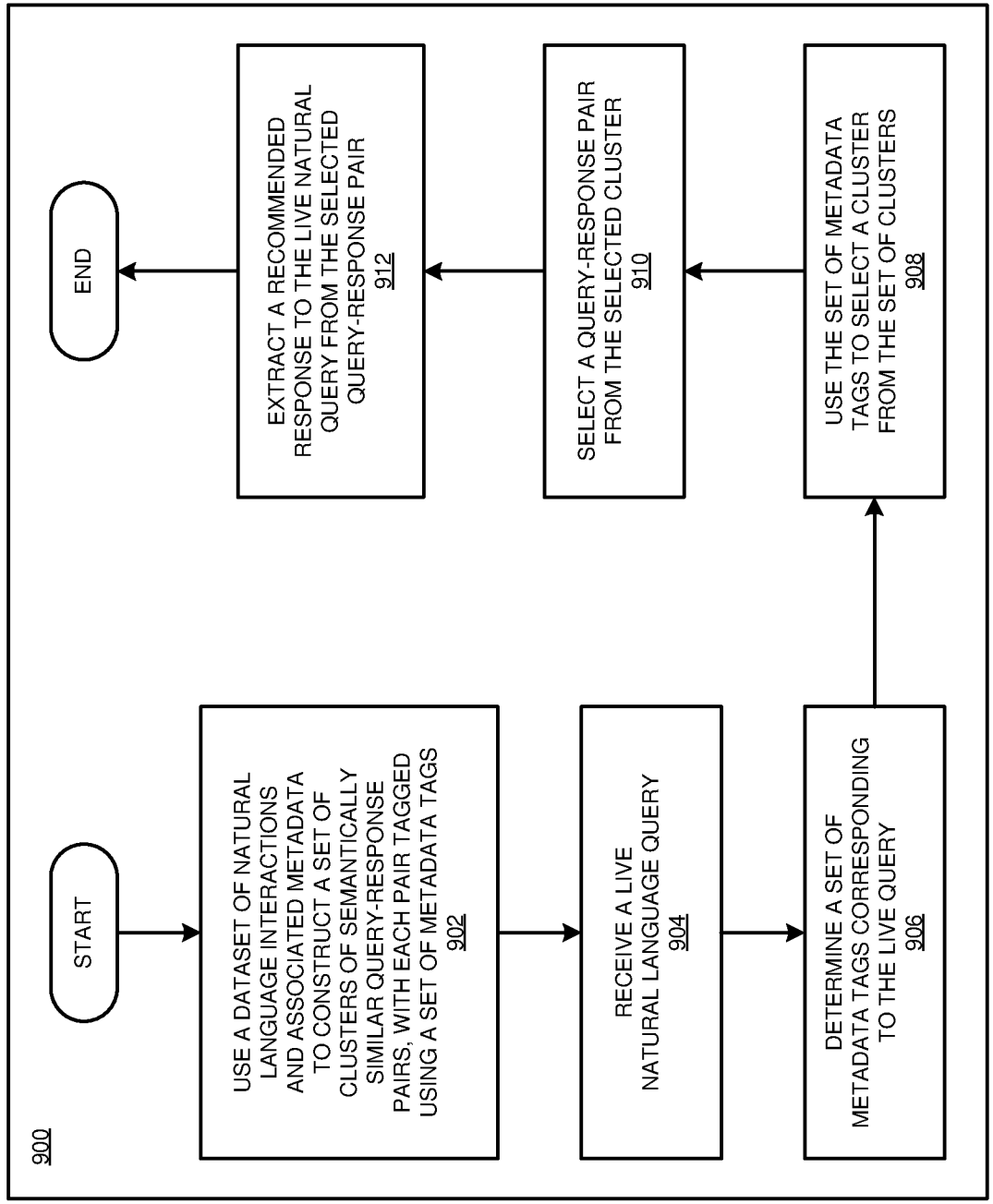
FIG. 9 depicts a flowchart of an example process for natural language response recommendation clustering for rapid retrieval in accordance with an illustrative embodiment.

With reference to FIG. 9, this figure depicts a flowchart of an example process for natural language response recommendation clustering for rapid retrieval in accordance with an illustrative embodiment. Process 900 can be implemented in application 300 in FIG. 3.

In block 902, the application uses a dataset of natural language interactions and associated metadata to construct a set of clusters of semantically similar query-response pairs, with each pair tagged using a set of metadata tags. In block 904, the application receives a live natural language query. In block 906, the application determines a set of metadata tags corresponding to the live query. In block 908, the application uses the set of metadata tags to select a cluster from the set of clusters. In block 910, the application selects a query-response pair from the selected cluster. In block 912, the application extracts a recommended response to the live natural query from the selected query-response pair. Then the application ends.

Figure 10:
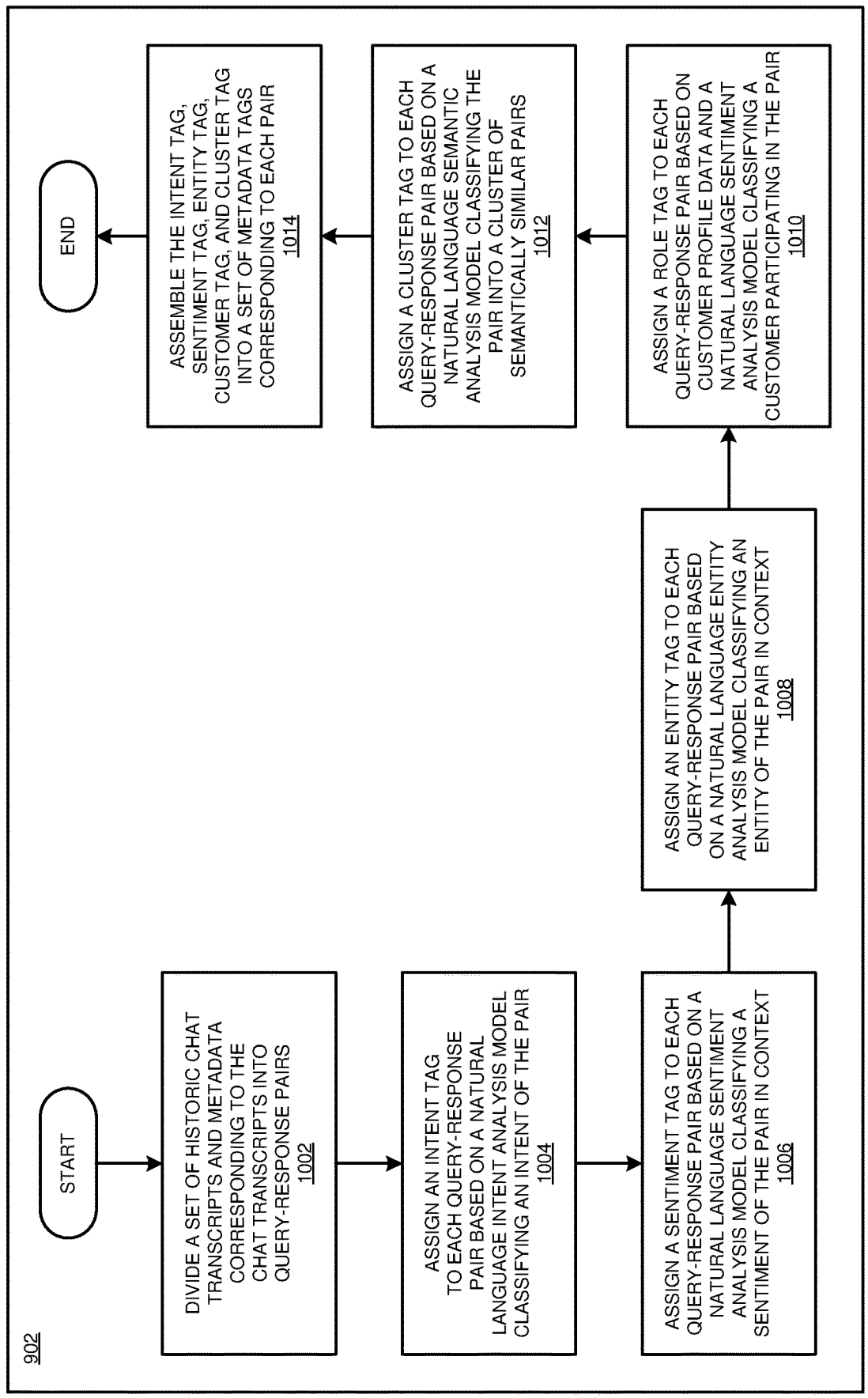
FIG. 10 depicts a flowchart of an example process for natural language response recommendation clustering for rapid retrieval in accordance with an illustrative embodiment.

With reference to FIG. 10, this figure depicts a flowchart of an example process for natural language response recommendation clustering for rapid retrieval in accordance with an illustrative embodiment. FIG. 10 provides more detail of block 902 in FIG. 9.

In block 1002, the application divides a set of historic chat transcripts and metadata corresponding to the chat transcripts into query-response pairs. In block 1004, the application assigns an intent tag to each query-response pair based on a natural language intent analysis model classifying an intent of the pair. In block 1006, the application assigns a sentiment tag to each query-response pair based on a natural language sentiment analysis model classifying a sentiment of the pair in context. In block 1008, the application assigns an entity tag to each query-response pair based on a natural language entity analysis model classifying an entity of the pair in context. In block 1010, the application assigns a role tag to each query-response pair based on customer profile data and a natural language sentiment analysis model classifying a customer participating in the pair In block 1012, the application assigns a cluster tag to each query-response pair based on a natural language semantic analysis model classifying the pair into a cluster of semantically similar pairs. In block 1014, the application assembles the intent tag, sentiment tag, entity tag, customer tag, and cluster tag into a set of metadata tags corresponding to each pair. Then the application ends.

Thus, a computer implemented method, system or apparatus, and computer program product are provided in the illustrative embodiments for natural language response recommendation clustering for rapid retrieval and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
setting, for a live natural language interaction, an interaction pace;
determining, according to the interaction pace, an acceptable response latency range;
determining, by analyzing a live natural language query, a set of metadata tags corresponding to the live natural language query;
selecting, using the set of metadata tags, a set of clusters of natural language query-response pairs, each query-response pair in the set comprising a natural language query and a corresponding natural language response, each cluster in the set defined according to a set of metadata tags previously applied to each query-response pair, a size of the set of clusters selected according to the acceptable response latency range;
selecting, from the set of clusters, a query-response pair, wherein the natural language query of the query-response pair has above a threshold relevance score with the live natural language query; and
extracting, from the selected query-response pair, a response recommendation comprising the natural language response of the selected query-response pair, the response recommendation being a recommended response to the live natural language query, a latency between receipt of the live natural language query and extraction of the response recommendation being within the acceptable response latency range.

2. The computer-implemented method of claim 1, wherein the set of metadata tags comprises an intent tag, a value of the intent tag determined by analyzing, using a natural language intent analysis model, the live natural language query.

3. The computer-implemented method of claim 1, wherein the set of metadata tags comprises an entity tag, a value of the entity tag determined by analyzing, using a natural language entity analysis model, the live natural language query.

4. The computer-implemented method of claim 1, wherein the set of metadata tags comprises a role tag, a value of the role tag determined by analyzing, using a natural language role analysis model, the live natural language query.

5. The computer-implemented method of claim 1, wherein each query-response pair in a first cluster has above a threshold semantic similarity to every other query-response pair in the first cluster.

6. The computer-implemented method of claim 1, wherein each query-response pair in a first cluster has the same set of values of the previously applied set of metadata tags.

7. The computer-implemented method of claim 1, further comprising:
selecting, from the set of clusters, a second query-response pair, the second query-response pair having a highest relevance score with the live natural language query;
determining, for each of a set of query-response pairs selected from the cluster containing the second query-response pair, a relevance score with the live natural language query;
forming, within the cluster containing the second query-response pair, a set of sub-clusters, each sub-cluster defined according to a set of sub-cluster tags;
selecting, from the set of sub-clusters, a third query-response pair, wherein the natural language query of the third query-response pair has above a threshold relevance score with the live natural language query; and
extracting, from the third query-response pair, a response recommendation comprising the natural language response of the selected query-response pair, the response recommendation being a recommended response to the live natural language query.

8. A computer usable program product comprising one or more computer-readable storage devices, and program instructions stored on at least one of the one or more storage devices, the stored program instructions comprising:
program instructions to set, for a live natural language interaction, an interaction pace;
program instructions to determine, according to the interaction pace, an acceptable response latency range;
program instructions to determine, by analyzing a live natural language query, a set of metadata tags corresponding to the live natural language query;
program instructions to select, using the set of metadata tags, a set of clusters of natural language query-response pairs, each query-response pair in the set comprising a natural language query and a corresponding natural language response, each cluster in the set defined according to a set of metadata tags previously applied to each query-response pair, a size of the set of clusters selected according to the acceptable response latency range;
program instructions to select, from the set of clusters, a query-response pair, wherein the natural language query of the query-response pair has above a threshold relevance score with the live natural language query; and
program instructions to extract, from the selected query-response pair, a response recommendation comprising the natural language response of the selected query-response pair, the response recommendation being a recommended response to the live natural language query, a latency between receipt of the live natural language query and extraction of the response recommendation being within the acceptable response latency range.

9. The computer usable program product of claim 8, wherein the set of metadata tags comprises an intent tag, a value of the intent tag determined by analyzing, using a natural language intent analysis model, the live natural language query.

10. The computer usable program product of claim 8, wherein the set of metadata tags comprises an entity tag, a value of the entity tag determined by analyzing, using a natural language entity analysis model, the live natural language query.

11. The computer usable program product of claim 8, wherein the set of metadata tags comprises a role tag, a value of the role tag determined by analyzing, using a natural language role analysis model, the live natural language query.

12. The computer usable program product of claim 8, wherein each query-response pair in a first cluster has above a threshold semantic similarity to every other query-response pair in the first cluster.

13. The computer usable program product of claim 8, wherein each query-response pair in a first cluster has the same set of values of the previously applied set of metadata tags.

14. The computer usable program product of claim 8, further comprising:
- program instructions to select, from the set of clusters, a second query-response pair, the second query-response pair having a highest relevance score with the live natural language query;
- program instructions to determine, for each of a set of query-response pairs selected from the cluster containing the second query-response pair, a relevance score with the live natural language query;
- program instructions to form, within the cluster containing the second query-response pair, a set of sub-clusters, each sub-cluster defined according to a set of sub-cluster tags;
- program instructions to select, from the set of sub-clusters, a third query-response pair, wherein the natural language query of the third query-response pair has above a threshold relevance score with the live natural language query; and
- program instructions to extract, from the third query-response pair, a response recommendation comprising the natural language response of the selected query-response pair, the response recommendation being a recommended response to the live natural language query.

15. The computer usable program product of claim 8, wherein the computer usable code is stored in a computer readable storage device in a data processing system, and wherein the computer usable code is transferred over a network from a remote data processing system.

16. The computer usable program product of claim 8, wherein the computer usable code is stored in a computer readable storage device in a server data processing system, and wherein the computer usable code is downloaded over a network to a remote data processing system for use in a computer readable storage device associated with the remote data processing system.

17. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
- program instructions to set, for a live natural language interaction, an interaction pace;
- program instructions to determine, according to the interaction pace, an acceptable response latency range;
- program instructions to determine, by analyzing a live natural language query, a set of metadata tags corresponding to the live natural language query;
- program instructions to select, using the set of metadata tags, a set of clusters of natural language query-response pairs, each query-response pair in the set comprising a natural language query and a corresponding natural language response, each cluster in the set defined according to a set of metadata tags previously applied to each query-response pair, a size of the set of clusters selected according to the acceptable response latency range;
- program instructions to select, from the set of clusters, a query-response pair, wherein the natural language query of the query-response pair has above a threshold relevance score with the live natural language query; and
- program instructions to extract, from the selected query-response pair, a response recommendation comprising the natural language response of the selected query-response pair, the response recommendation being a recommended response to the live natural language query, a latency between receipt of the live natural language query and extraction of the response recommendation being within the acceptable response latency range.

18. The computer system of claim 17, wherein the set of metadata tags comprises an intent tag, a value of the intent tag determined by analyzing, using a natural language intent analysis model, the live natural language query.

19. The computer system of claim 17, wherein the set of metadata tags comprises an entity tag, a value of the entity tag determined by analyzing, using a natural language entity analysis model, the live natural language query.

20. The computer system of claim 17, wherein the set of metadata tags comprises a role tag, a value of the role tag determined by analyzing, using a natural language role analysis model, the live natural language query.

\* \* \* \* \*